3,451,527
ARTICLE HANDLING CONVEYORS
John M. Leach, P.O. Box 341,
Port Jefferson, N.Y. 11777
Continuation of application Ser. No. 629,808, Apr. 10, 1968, now Patent No. 3,400,806, dated Sept. 10, 1968. This application May 3, 1968, Ser. No. 726,381
Int. Cl. B65g 13/071, 13/07
U.S. Cl. 198—127                          11 Claims

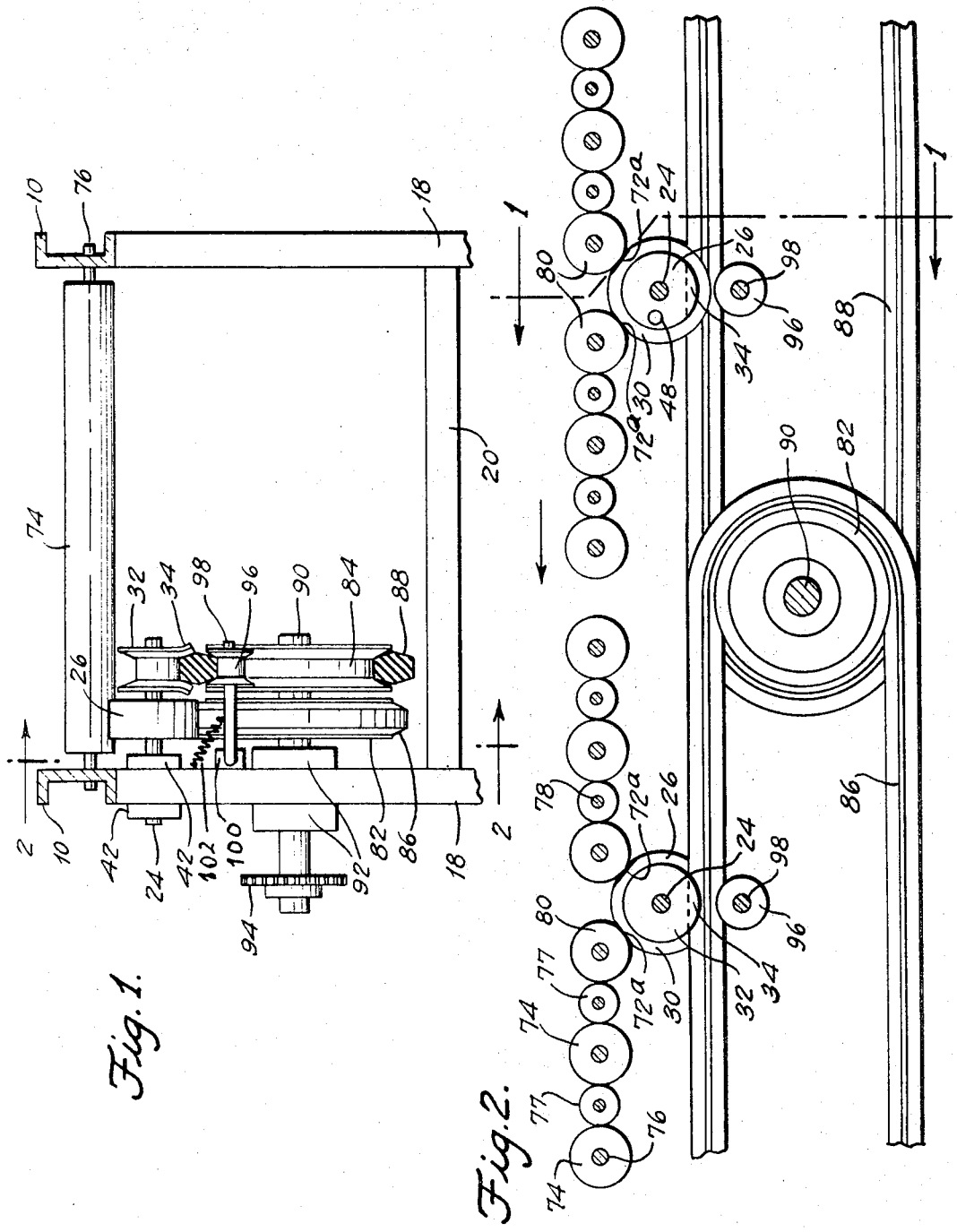

ABSTRACT OF THE DISCLOSURE

This invention relates to power driven article conveyors of the type commonly known as accumulation conveyors. In the operation of such type conveyor, whenever an article is stopped thereon for any reason, suitable mechanism is operated to stop the forward movement of the next article behind the stopped article in the direction of article flow just before or just as it touches the stopped article ahead, and this action is continued along down the line of approaching articles so as to prevent the articles from forcibly crowding together sufficiently to damage each other or make them difficult to remove from the line.

---

This application is a continuation of application Ser. No. 629,808, filed Apr. 10, 1967, now U.S. Patent No. 3,400,806, covering article handling conveyors. All of the objects set forth in that application apply with equal force to this invention.

It is also an object of the present invention to provide an accumulation type conveyor employing a band-type driving element which can transmit a greater driving force than hertofore.

It is another object of the present invention to provide an accumulation type conveyor employing a band-type driving element which has a greater efficiency of operation than heretofore.

It is a further object of the present invention to provide an accumulation-type conveyor employing a band-type driving element in endless form which can be replaced quickly without requiring any disassembly of the conveyor structure.

Other objects and advantages of the present invention will become apparent to those skilled in the art upon recourse to the following specification and drawing, in which:

FIG. 1 is a cross sectional view of one type of article conveyor constructed in accordance with the present invention and taken substantially on the plane indicated by line 1—1 of FIG. 2 and looking in the direction of the arrows, and FIG. 2 is a fragmentary cross sectional view of the article conveyor taken substantially in the plane indicated by line 2—2 of FIG. 1 and looking in the direction of the arrows and with all frame elements eliminated in order to more clearly show the more important structure.

The present invention is described in this application as being applied to a roller-type conveyor but it is to be understood that it can with equal facility be applied to a skate wheel-type conveyor exactly in the same way as shown in said above identified application.

What is now considered the preferred embodiment of the present invention comprises an accumulation conveyor comprising a frame formed of two side members 10 suitably supported at desired intervals by legs 18 in pairs which are tied together by cross members 20.

Rollers 74 suitably journalled on individual shafts 76 which are supported by the members 10 provide article supporting and moving elements. These rollers 74 are preferably driven together in any desired numbers by friction wheels 77 suitably rotatably mounted on stub shafts 78 which are supported by a member 10. The friction wheels 77 are preferably formed of some desirable friction material such as rubber or plastic and contact adjacent rollers with sufficient pressure to drive one roller from the next roller.

Each two groups of interdriven rollers 74 are simultaneously driven by placing the adjacent end roller 80 of each group in frictional contact with a friction driving wheel 26 provided with a suitable friction tread member 30. Each wheel 26 is suitably mounted for rotation with a shaft 24 mounted as shown in FIG. 1 in bearings 42 carried by a leg 18. Each shaft 24 also carries for rotation therewith a clutch member 32 which is shaped like a V-belt pulley with the sides forming the V area opened outwardly at one section of the periphery as shown at 34.

A pair of V-pulleys 82 and 84 are suitably mounted for rotation with a shaft 90 supported in bearings 92 carried by a leg member 18. The pulleys 82 and 84 each support one end of each of V-belts 86 and 88, respectively. The opposite end of each V-belt 86 and 88 is supported by a longitudinally adjustable take-up V-pulley (not shown) in known manner so that the two V-belts can be maintained at the proper tension. The V-belts are driven by means of a sprocket 94 also carried for rotation with shaft 90 and which is driven from any desired type of power source (not shown).

The V-belts 86 and 88 are what is known commercially as double or back-to-back V-belts in that they are shaped in cross section like two single V-belts fastened together at their tops. Such double V-belts are at least twice as strong as single V-belts.

Two double V-belts are used in the modification shown and driven at the center point instead of using one double V-belt twice as long and driven at one end in order to reduce the length and transmitted load on any one belt section. The two double V-belts thus form two separate drive units extending in opposite directions and commonly driven. It will be noted that the relative positions of the wheels 26 and clutch members 32 must be reversed for each belt as shown in FIG. 2. The top run of each belt 86 and 88 drives the clutch members 32 as shown in FIG. 1. The use of double V-belts makes it possible for each belt to drive the bottom of each clutch member 32 instead of having to pass over the top of each member 32. This keeps all of each belt 86 and 88 down below the clutch members 32 and eliminates any congested area above the members 32 near the rollers 74.

A pulley 96 is suitably mounted for rotation on a shaft 98 suitably pivotally mounted at 100 on a leg 18. A spring 102 lightly presses the pulley 96 up against a V-belt so as to keep the V-belt seated into each clutch member 32. This arrangement makes it possible to maintain the driving runs of the V-belts in a straight line instead of curving up over each V-pulley clutch member 32 and then down under snubbing pulleys which greatly reduces the inherent friction in the system and thereby reduces the driving power required and increases the efficiency of the equipment.

Each wheel 26 is provided with a projection 48 located on one side or the other depending on the relative location of the adjacent clutch member 32 and positioned 90 degrees away from the opened-out section 34 of the sides just as described in the above identified application. Article operated mechanism such as that also described and shown in said application is provided to cooperate with the stop 48 as described to stop rotation of the wheel 26 and clutch member 32 when the article operated mechanism is operated. This always occurs when the opened-out sides are over the V-belt also as described in said application. This mechanism has been omitted from these drawings in order to more clearly illustrate the novel features of this application.

When desired, flats 72A can be placed as shown on the periphery of each wheel 26 as described in said application. This will permit rollers 74 to coast after the co-operating wheel 26 is stopped and thus reduce the stopping torque on the projection 48, as well as reduce the starting torque on clutch member 32 and greatly reduce the drag on a V-belt when it is passing through an opened-out area 34 of a clutch member. This even further reduces the inherent friction in the equipment and extends the operating life of the V-belts.

The accumulation operation of the conveyor of this invention is the same as that of the accumulation conveyor described in said application. That is, when an article being moved on the conveyor by the article supporting and moving elements is stopped, for example at the end of the conveyor, the stopped article will operate a suitable mechanism such as that described in said application to move into the path of the stop member 48 of the driving wheel 26 for the article driving elements located just behind the stopped article in the direction of travel of the articles and stop those driving elements from turning. When the next article moves onto the driving elements so stopped it too will be stopped before it can tightly jam the first stopped article and it will also deactivate the driving elements just behind it to stop the next article and so on down the entire length of the accumulation conveyor and thus prevent any tight wedging of articles along the conveyor as occurs when a non-accumulation-type conveyor is used.

All of the time that the V-pulley 32 is stopped the driving V-belt will pass through the opened-out area 34 with only a very light frictional drag on the pulley. As soon as the stop member 48 is freed up by an article being removed ahead of it the light frictional drag of the belt will rotate the pulley 32 just the slight amount required for the V-belt to come into contact with the normal size V-groove of the pulley and grip the pulley to rotate it positively to move the article resting on the driving elements operated by that V-pulley, and so on along the conveyor.

It will be noted that the construction of this invention makes it possible to replace a double V-belt with a minimum of time and effort. All that is required is to suitably move a take-up pulley for a belt (not shown) to reduce the tension on the belt, and then lift the old belt off of its pulleys and put on the new one.

The foregoing is to be considered as descriptive and not limitative because many changes and modification can be made in the physical embodiment of the invention without departing from the spirit of the invention and its encompassment.

The invention having been described, what is claimed is:

1. An article handling conveyor comprising a frame, rotatable elements mounted on said frame for supporting and moving articles, a double V-belt extending adjacent said rotatable elements, means for supporting and driving said double V-belt including V-pulleys in contact with the inner half thereof, and means including other V-pulleys in contact with the outer half of said double V-belt for driving said rotatable elements.

2. An article handling conveyor as specified in claim 1 further characterized by means associated with said other V-pulleys to maintain said outer half of said double V-belt in frictional contact therewith.

3. An article handling conveyor as specified in claim 1 further characterized in that each of said other V-pulleys has a section of its circumference in which the sides forming the V of the pulley are spaced further apart than over the remainder of the circumference to provide a belt slippage area which becomes active whenever a said other V-pulley is stopped with said outer half of said double V-belt running in said area.

4. An article handling conveyor as specified in claim 1 further characterized in that said means for driving said rotatable elements further includes a friction wheel mounted for movement with each of said other V-pulleys and in frictional driving contact with a rotatable element.

5. An article handling conveyor as specified in claim 1 further characterized in that said means for driving said rotatable elements further includes a friction wheel mounted for movement with each of said other V-pulleys and in frictional driving contact with two rotatable elements.

6. An article handling conveyor as specified in claim 4 further characterized in that a friction driving wheel is placed between and in contact with each rotatable element contacted by said first named friction wheel and the next adjacent rotatable element not contacted by said first named friction wheel.

7. An article handling conveyor as specified in claim 5 further characterized in that a friction driving wheel is placed between and in contact with each rotatable element contacted by said first named friction wheel and the next adjacent rotatable element not contacted by said first named friction wheel.

8. An article handling conveyor as specified in claim 1 further characterized in that said double V-belt drive is divided into separate but complete commonly driven units extending in opposite directions.

9. An article handling conveyor as specified in claim 6 further characterized in that said double V-belt drive is divided into separate but complete commonly driven units extending in opposite directions.

10. An article handling conveyor as specified in claim 7 further characterized in that said double V-belt drive is divided into separate but complete commonly driven units extending in opposite directions.

11. An article handling conveyor comprising a frame, rotatable elements mounted on said frame for supporting and moving articles, a run of powered V-belt extending adjacent said rotatable elements, means for supporting and driving said V-belt, means including V-pulleys in contact with a V-side of said run of V-belt for driving said rotatable elements, and a pressure exerting element in contact with the opposite side of said run of V-belt opposite each of said V-pulleys for retaining the V-belt seated in the grooves of said V-pulleys.

References Cited

UNITED STATES PATENTS 3,263,797  8/1966  Lutes _____ 198—127
3,323,636  6/1967  Gotham _____ 198—127

RICHARD E. AEGERTER, *Primary Examiner.*